US009561550B2

(12) United States Patent
Lutz et al.

(10) Patent No.: US 9,561,550 B2
(45) Date of Patent: *Feb. 7, 2017

(54) EJECTOR DRILL SYSTEM

(71) Applicants: David A. Lutz, Navarre, OH (US);
James R. Porter, Belmont, OH (US);
Chad M. Lynch, Uhrichsville, OH
(US)

(72) Inventors: David A. Lutz, Navarre, OH (US);
James R. Porter, Belmont, OH (US);
Chad M. Lynch, Uhrichsville, OH
(US)

(73) Assignee: ALLIED MACHINE &
ENGINEERING CORP., Dover, OH
(US)

(*) Notice: Subject to any disclaimer, the term of this patent is extended or adjusted under 35 U.S.C. 154(b) by 386 days.

This patent is subject to a terminal disclaimer.

(21) Appl. No.: 14/052,108

(22) Filed: Oct. 11, 2013

(65) Prior Publication Data

US 2014/0037391 A1   Feb. 6, 2014

Related U.S. Application Data

(63) Continuation of application No. 12/142,987, filed on Jun. 20, 2008, now Pat. No. 8,556,550.

(Continued)

(51) Int. Cl.
B23B 51/06        (2006.01)
B23B 29/03        (2006.01)
(Continued)

(52) U.S. Cl.
CPC .............. B23B 51/06 (2013.01); B23B 29/03 (2013.01); B23B 41/02 (2013.01);
(Continued)

(58) Field of Classification Search
CPC ...... B23B 41/02; B23B 51/06; B23B 2251/02;
B23B 2251/50; B23B 2251/68; Y10T
408/44; Y10T 408/45; Y10T
408/50; Y10T 408/5586; Y10T 408/9095;
Y10S 408/705
See application file for complete search history.

(56) References Cited

U.S. PATENT DOCUMENTS 2,953,951 A * 9/1960 Carlstedt ............. B23B 51/0486
                                                      408/59
2,969,699 A * 1/1961 Werner ............... B23B 51/0486
                                                      408/199
(Continued)

FOREIGN PATENT DOCUMENTS

DE      1477426 B      3/1969
JP      54-040384 A    3/1979
(Continued)

OTHER PUBLICATIONS

Iscar Deep Drill, Single Tube System, External Thread Drilling Heads, pp. 1-13, 2009.
(Continued)

Primary Examiner — Eric A Gates
(74) Attorney, Agent, or Firm — Hahn Loeser + Parks LLP; Scott M. Oldham, Esq.

(57) ABSTRACT

A drilling head for a tubular shank having an inside diameter and threads may comprise an axial body comprising a duct exiting through a first end; threads adjacent the first end corresponding to the threads on the shank and aligning the duct with the shank inside diameter; a bore from an outer surface of the body to the duct; and two axially extending approximately parallel and offset surfaces adjacent a second end; and an insert affixed between the offset surfaces, the insert comprising: a first face at least partially contacting one offset surface and a second face at least partially contacting (Continued)

the other offset surface; one or more cutting edges adjacent the first face, the second face, or both; and a cutting lip adjacent one or more cutting edges.

11 Claims, 7 Drawing Sheets

Related U.S. Application Data

(60) Provisional application No. 60/947,249, filed on Jun. 29, 2007.

(51) Int. Cl.
 B23B 51/00 (2006.01)
 B23B 41/02 (2006.01)

(52) U.S. Cl.
 CPC ...... *B23B 51/0009* (2013.01); *B23B 2251/02* (2013.01); *B23B 2251/50* (2013.01); *B23B 2251/68* (2013.01); *B23B 2260/138* (2013.01); *Y10S 408/705* (2013.01); *Y10T 408/44* (2015.01); *Y10T 408/45* (2015.01); *Y10T 408/50* (2015.01); *Y10T 408/5586* (2015.01); *Y10T 408/89* (2015.01); *Y10T 408/9095* (2015.01)

(56) References Cited

U.S. PATENT DOCUMENTS

| | | | |
|---|---|---|---|
| 3,274,863 A * | 9/1966 | Faber | B23B 51/04 408/207 |
| 3,743,556 A | 7/1973 | Breton et al. | |
| 4,160,616 A * | 7/1979 | Winblad | B23B 51/00 408/144 |
| 4,274,908 A | 6/1981 | Fishter et al. | |
| 4,616,964 A | 10/1986 | Nomura | |
| 5,030,042 A | 7/1991 | Haga et al. | |
| 5,316,419 A | 5/1994 | Bohnet et al. | |
| 5,451,126 A * | 9/1995 | Brun | B23B 51/042 408/1 R |
| 5,544,985 A | 8/1996 | Lane | |
| 5,559,713 A | 9/1996 | Brown et al. | |
| 5,791,838 A | 8/1998 | Hamilton | |
| 5,820,313 A | 10/1998 | Weber | |
| 5,820,318 A | 10/1998 | Danielsson et al. | |
| 5,860,773 A | 1/1999 | Blomberg et al. | |
| 5,915,890 A | 6/1999 | Rittweger et al. | |
| 5,947,660 A | 9/1999 | Karlsson et al. | |
| 5,954,459 A | 9/1999 | Noguchi et al. | |
| 5,964,553 A | 10/1999 | Blomberg et al. | |
| 5,971,674 A | 10/1999 | Holley | |
| 6,019,553 A | 2/2000 | Yakamavich, Jr. | |
| 6,071,046 A | 6/2000 | Hecht et al. | |
| 6,095,725 A | 8/2000 | Stahl | |
| 6,270,297 B1 * | 8/2001 | Fang | B23B 51/0009 407/116 |
| 6,283,682 B1 | 9/2001 | Plummer | |
| 6,309,762 B1 | 10/2001 | Speckert | |
| 6,539,827 B2 | 4/2003 | Yamaji et al. | |
| 6,626,614 B2 | 9/2003 | Nakamura | |
| 6,682,275 B1 | 1/2004 | Lindblom et al. | |
| 6,698,981 B1 | 3/2004 | Beno et al. | |
| 6,739,809 B2 | 5/2004 | Shaffer | |
| 6,783,307 B2 | 8/2004 | Lindblom | |
| 6,783,308 B2 | 8/2004 | Lindblom | |
| 6,948,890 B2 | 9/2005 | Svensson et al. | |
| 7,004,691 B2 | 2/2006 | Nomura | |
| 7,018,145 B2 | 3/2006 | Mast et al. | |
| 7,114,892 B2 | 10/2006 | Hansson | |
| 7,134,816 B2 | 11/2006 | Brink | |
| 7,153,071 B2 | 12/2006 | Blomberg et al. | |
| 7,195,428 B2 | 3/2007 | Astakhov et al. | |
| 7,320,565 B2 | 1/2008 | Danielsson et al. | |
| 7,326,009 B2 | 2/2008 | Lindblom | |
| 7,611,311 B2 | 11/2009 | Kakai et al. | |
| 8,388,279 B2 * | 3/2013 | Kitsukawa | B23B 51/06 408/207 |
| 2003/0175085 A1 | 9/2003 | Prokop | |
| 2005/0025594 A1 | 2/2005 | Lindblom | |
| 2005/0025928 A1 | 2/2005 | Annanolli et al. | |
| 2005/0105977 A1 * | 5/2005 | Ishihara | B23B 51/06 408/1 R |
| 2006/0045640 A1 | 3/2006 | Hessman | |
| 2006/0222470 A1 | 10/2006 | Schornyet et al. | |
| 2007/0036622 A1 * | 2/2007 | Lee | B23B 51/0009 408/227 |
| 2009/0110501 A1 * | 4/2009 | Drori | B23B 51/04 408/209 |
| 2012/0285749 A1 * | 11/2012 | Bohn | B23B 51/06 175/393 |

FOREIGN PATENT DOCUMENTS

| | | | |
|---|---|---|---|
| JP | 58-045807 A | | 3/1983 |
| JP | 58-191913 U | | 12/1983 |
| JP | 59-196108 U | | 7/1984 |
| JP | 61168415 A | * | 7/1986 |
| JP | 07068408 A | * | 3/1995 |
| JP | 07-314229 A | | 5/1995 |
| JP | 2002321111 A | * | 11/2002 |
| JP | 2007030048 A | * | 2/2007 |
| SU | 1212710 A | * | 2/1986 |
| WO | 2009006042 A1 | | 1/2009 |

OTHER PUBLICATIONS

System BTA Drilling Tools Overview, System BTA Drilling Tools, Information, pp. 1-4, Aug. 11, 2005.
Sandvik Deep hole Drilling, STS system, high material removal rate with high accuracy, pp. 1-18, 2009.
Botek USA, Inc., System BTA Drilling Tools Overview, System BTA Drilling Tools, Information, pp. 1-5, 2009.
Iscar Cutting Tools-Metal Working Tools-Iscar Catalog: Hole Making—Deepdrill, Iscar Drill, pp. 1-2, 2009.

* cited by examiner

EJECTOR DRILL SYSTEM

This application is a continuation of U.S. patent application Ser. No. 12/142,987 filed Jun. 20, 2008, which claims the benefit of U.S. Provisional Patent Application Ser. No. 60/947,249 filed Jun. 29, 2007, each of which are hereby incorporated by reference.

BACKGROUND AND SUMMARY OF THE DISCLOSURE

Certain deep hole drilling systems such as gun drills, single tube drilling systems, and double tube drilling systems are known in the art. These deep hole drilling systems may be used for drilling holes with a large depth to diameter ratio.

A single tube system, or STS drilling system may be used to drill holes having large depth to diameter ratios with improved penetration rates, hole size accuracy, and straightness over gun drills. At the same time, such systems have various disadvantages, such as tending to cut on themselves, due to a single effective cutting edge. This causes significant stresses. Additionally, such systems may utilize a wear pad, which due to the configuration, tends to bear on the sides of the formed hole during cutting with significant force, such that the wear pad tends to cause hardening of the hole and embrittlement of the material. This may be termed work hardening of the hole, which is undesirable. The STS drilling system may include a drilling head, a boring shank, or tube, and a pressure head. The drilling head may be threaded onto the tube, the inside of the tube being in communication with one or more apertures through the drilling head. In operation, the pressure head may force cutting fluid between the outside of the tube and the hole wall. The cutting fluid may be evacuated along with chips created by the drilling process through the drilling head and up through the center of the tube.

The STS requires a cutting fluid delivery system for providing a volume of cutting fluid at pressures of up to 1000 pounds per square inch (about 689.4 kilopascals) or more. The pressure head introduces cutting fluid between the tube and the hole wall. To maintain pressure in the cavity, the pressure head may seal against the part being drilled to produce a water tight seal. In one sealing embodiment, the part being drilled may have a flat area around the drilled hole for the pressure head to seal.

A Double Tube System, or DTS drilling system, also known as an Ejector System, is based on similar principles as the Single Tube System. Both systems may utilize a cylindrical body design and evacuate cutting fluid and chips internally. The DTS system may use less cutting fluid pressure and volume.

The DTS drilling system may include a drilling head, an outer tube, an inner tube, and a rotating or non-rotating machine connection. The drilling head may be threaded onto the outer tube, with the inner tube in communication with one or more apertures through the drilling head. Both the inner and outer tubes are retained by the machine tool connector. Cutting fluid is channeled through the machine tool connector and between the outer tube and the inner tube. A portion of the cutting fluid is directed internally into the inner tube through venturi slots manufactured into the inner tube wall. The remaining cutting fluid proceeds to the cutting edge in order to cool and lubricate the tool. The cutting fluid diverted through the venturi slots creates a low pressure area in the inner tube drawing cutting fluid and chips from the cutting edge through the drilling head and into the inner tube. This vacuum-like phenomena may reduce the amount of cutting fluid pressure and volume by up to 50% or more. Certain DTS system embodiments may be used for holes that are about 0.75 inches (about 19 millimeters) in diameter or larger.

The drilling heads for STS and DTS drilling systems may comprise a threaded tool body with chip evacuation inlet apertures, one or more cutting edges, and one or more wear pads. The cutting edges in the prior art have included hardened steel cutting edges or a plurality of inserts. Drilling heads in the prior art contain cutting edges that are difficult to replace or re-sharpen, and are discarded after the cutting edges are worn.

There remains a need for STS and DTS drilling systems to overcome these and other disadvantages of the prior art.

A drilling head according to an example of the present invention is disclosed for a tubular shank having an inside diameter and threads comprising an axial body having a duct exiting through a first end. Threads adjacent the first end corresponding to the threads on the shank align the duct with the shank inside diameter. A bore is provided from an outer surface of the body to the duct; and two axially extending approximately parallel and offset surfaces adjacent a second end. An insert is affixed between the offset surfaces, the insert comprising: a first face at least partially contacting one offset surface and a second face at least partially contacting the other offset surface; one or more cutting edges adjacent the first face, the second face, or both; and a cutting lip adjacent one or more cutting edges.

DETAILED DESCRIPTION OF THE DRAWINGS

Referring now to FIG. 1-7, examples of a drilling system according to the invention are set forth. In FIGS. 1-5, an example of the drilling system is shown, having a drilling head 10 which may comprise an ejector holder body 12 and at least one cutting insert 14. The cutting insert 14 may be, for example but not limited to, a spade insert. Any suitable cutting insert 14 may be used in the ejector holder body 12. In operation, the ejector holder body 12 and cutting insert 14 rotate about an axis of rotation through the centerline of the hole being drilled.

Figure 1:
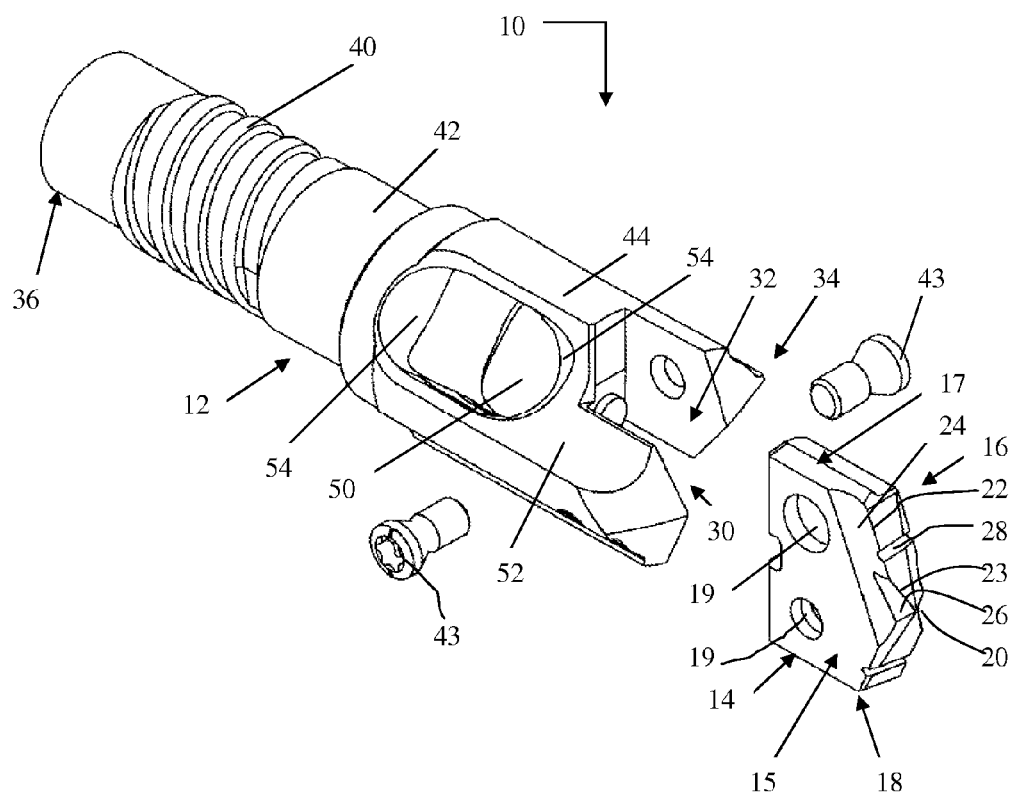
FIG. 1 is an exploded perspective view of a drilling head of the present disclosure.
Figure 2:
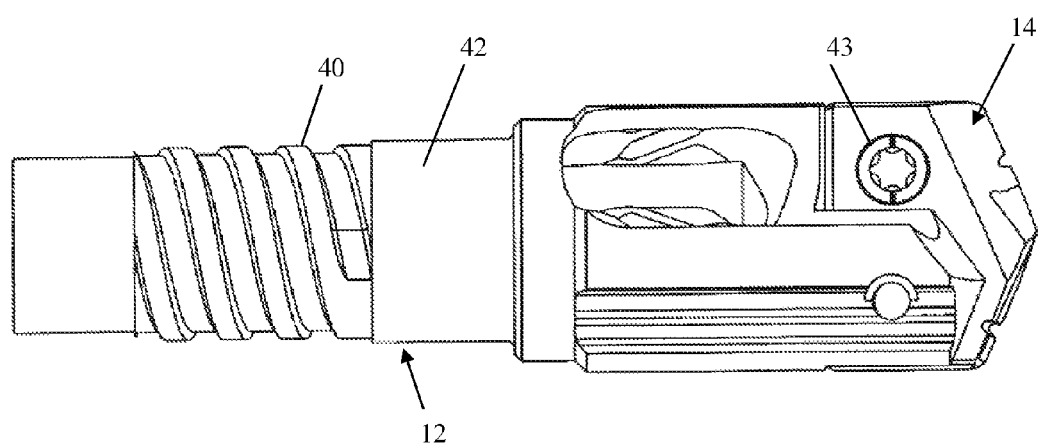
FIG. 2 is a side elevational view of the drilling head of FIG. 1.

As shown in FIG. 1, the cutting insert 14 may be a spade insert having an approximately flat polygonal shape having a first face 15, a second face 16, a first side 17, and a second side 18. The cutting insert may comprise one or more mounting apertures 19 through the first and second faces 15, 16. The cutting insert may further comprise a self-centering point 20, cutting edges 22, cutting lip 24, web cutting edges 23, cutting web 26, and optionally one or more chip breakers 28.

The cutting insert 14 may include cutting edges 22. The cutting edges 22 may be positioned at the leading edges as the insert rotates. The cutting insert 14 may be an approximately symmetrical shape with the axis of rotation passing through the self-centering point 20. In this embodiment, the insert may have cutting edges 22 on both sides of the insert. The cutting edges 22 may extend about from the web cutting edges 23 around self centering point 20 toward the first side 17 adjacent the first face 15, from the self centering point 20 toward the second side 18 adjacent the second face 16, or both. Any number of cutting edges may be provided for making a desired hole diameter.

At least one cutting lip 24 may be positioned adjacent one or more cutting edges 22. The cutting lip 24 may include geometry capable of producing a curled metal chip for evacuating through the ejector holder body 12. The size and shape of the chip may be controlled by altering the cutting lip 24 position, size and configuration.

At least one cutting web 26 may be positioned adjacent the self-centering point 20, and the cutting web 26 may comprise one or more web cutting edges 23. The cutting web 26 may enable the material at the tip of the cutting insert 14 to shear and form a manageable chip. Some prior art drilling systems do not mechanically cut material (chip formation) at the center of the drilled hole, instead extruding material due to the low angular velocity at the center of the drill point. The cutting web 26 may enable chip formation at the drill point and reduce extrusion due to the shearing ability of the cutting web 26. Further, the cutting web 26 may enable the drill cutting insert 14 to start the hole on-center and retain its straightness.

One or more chip breakers 28 may be optionally provided on the cutting insert 14 to control the chip width. Controlling the chip width further enables the chip to be evacuated through the center of the ejector holder body 12. In some applications, chip breakers may not be required, for example with use in cutting cast iron or carbon fibers.

The ejector holder body 12 may comprise a generally tubular shape having a first end, or shank end 36, and a second end, or insert end 34. An evacuation channel, or duct 38 through at least a portion of the ejector holder body 12 may exit the shank end 36 for passing chips and cutting fluid through the ejector holder body 12 and into the shank, or tube. The shank end 36 may be configured to attach to a boring shank, or tube, (not shown). The tube may have an inside diameter and threads for attaching the drilling head. The ejector holder body 12 may comprise threads 40 adjacent the first end, or shank end 36, corresponding to the threads on the shank and aligning the duct 38 with the shank, or tube, inside diameter. The duct 38 does not have to be the same diameter as the inside diameter of the tube when the duct and tube are aligned.

The threads 40 may be multiple lead locking threads. Alternately, the threads 40 may be a single lead thread.

A tube bearing surface 42 may be provided on the ejector holder body 12 adjacent the intersection of the tube and the ejector holder body 12. The tube bearing surface 42 may fit within an inside diameter of the tube and fit adjacent an inside surface of the tube. The tube bearing surface 42 may be used to align the ejector holder body 12 with the tube. The tube bearing surface may be precision ground to mate closely with the inside surface of the tube. A close tolerance fit may reduce total indicator run-out associated with the ejector drilling system and improve hole straightness.

The threads 40 or the tube bearing surface 42 or a combination thereof may be designed to substantially seal the union between the tube and the ejector holder body 12. Other sealing devices or methods may be utilized, such as for example but not limited to one or more o-rings, gaskets, sealing tapes, caulking materials, adhesives, or other sealing materials.

The boring shank, or tube, may be provided with threads on the inside surface corresponding to the threads 40 of the ejector holder body 12. The inside tube threads may be locking threads that draw the threads 40 tighter into the tube as the drilling system is rotated in operation.

Alternately, the ejector holder body 12 may attach to the boring shank, or tube, by other attachments, such as for example but not limited to one or more keyways, clamps, flanges, screws, or other fasteners.

The insert end 34 may be configured for attaching the cutting insert 14. The insert end 34 may be configured with two axially extending approximately parallel and offset surfaces 30, 32 adjacent a second end. The surfaces 30, 32 may be offset a distance equal to the thickness of the insert 14. The surfaces 30, 32 may also be offset in a longitudinal direction to provide clearance for fastening the insert 14 to the body 12. The cutting insert 14 may attach to the insert end 34 with the first face 15 at least partially contacting one offset surface 30 and the second face 16 at least partially contacting the other offset surface 32 by one or more screws 43 through the mounting apertures 19 of the cutting insert 14.

The ejector holder body 12 may comprise a bearing area 44. The bearing area 44 may include one or more outer surfaces of the ejector holder body 12. The bearing area 44 may have a layer of chrome to protect the bearing area 44 in operation. The outer diameter of the bearing area 44 may be slightly smaller than drill diameter. The chrome layer may protect the bearing area 44 at lower rotational speeds and temperatures.

Figure 4:
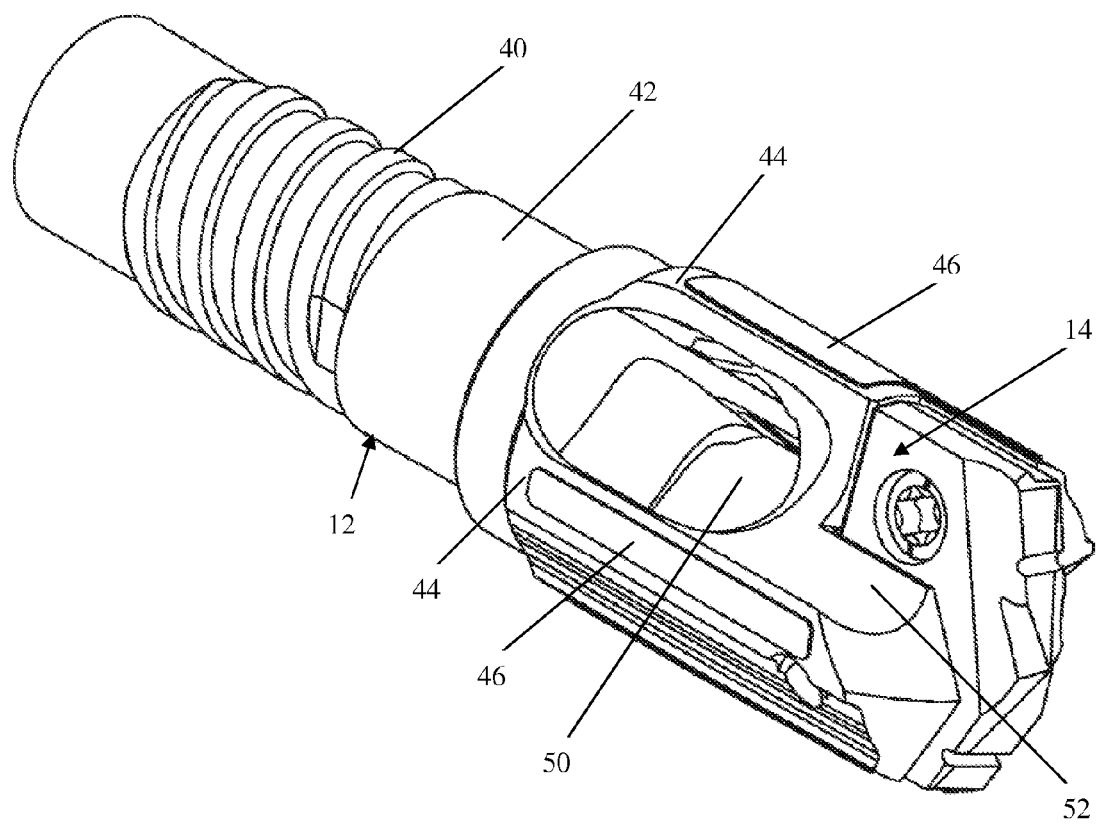
FIG. 4 is a perspective view of the drilling head of FIG. 1 including carbide cladding.
Figure 5:
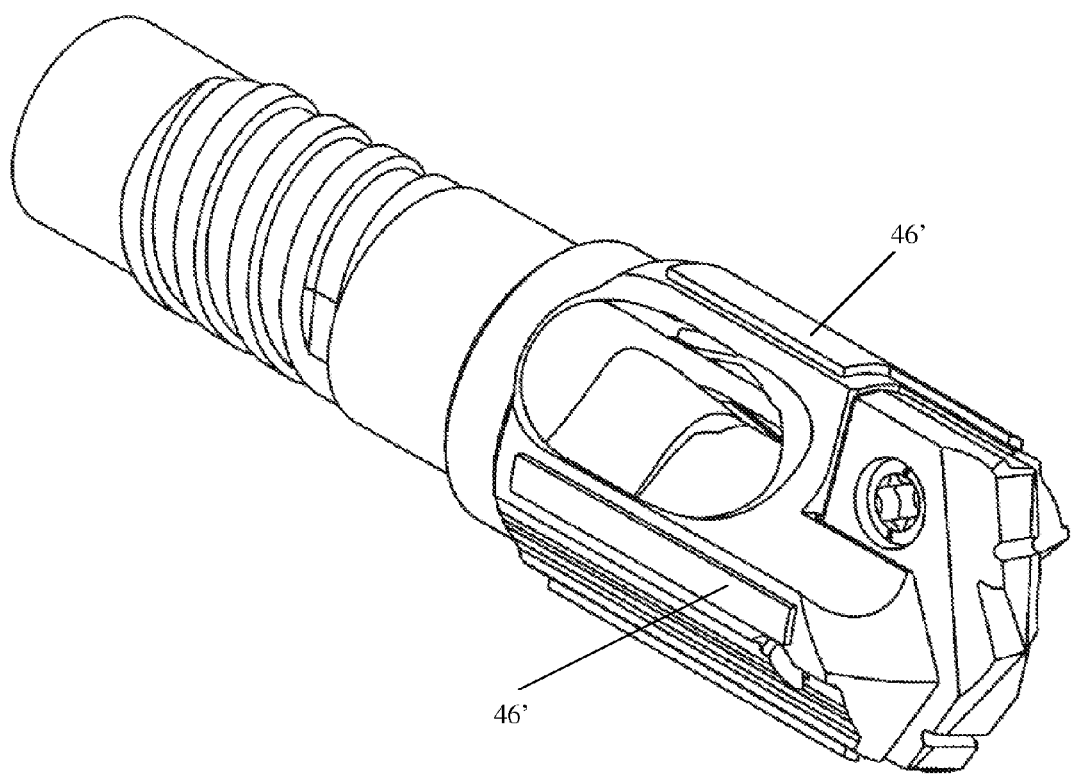
FIG. 5 is a perspective view of the drilling head of FIG. 1 including carbide wear pads.

As shown in FIGS. 4 and 5, the bearing area 44 may comprise a cladding 46 on at least a portion of the outer surface of the body. The cladding 46 may comprise a thin layer of a carbide material on the surface positioned at an outside diameter of the body. The outer diameter of the cladding 46 may be slightly smaller than drill diameter. The cladding 46 may protect the bearing area 44 at higher rotational speeds and temperatures. In the example of FIG. 5, there are provided a plurality of carbide wear pads 46' as an alternative embodiment. The wear pads 46' may be brazed into position or otherwise suitably secured. The thickness of the cladding 46 or wear pads 46' may be increased as suitable for the application. The cladding 46 and wear pads 46' may be formed of a carbide material, such as titanium carbide, a tungsten carbide, aluminum bronze, high speed steel, hard chroming or other suitable wear material.

Figure 3:
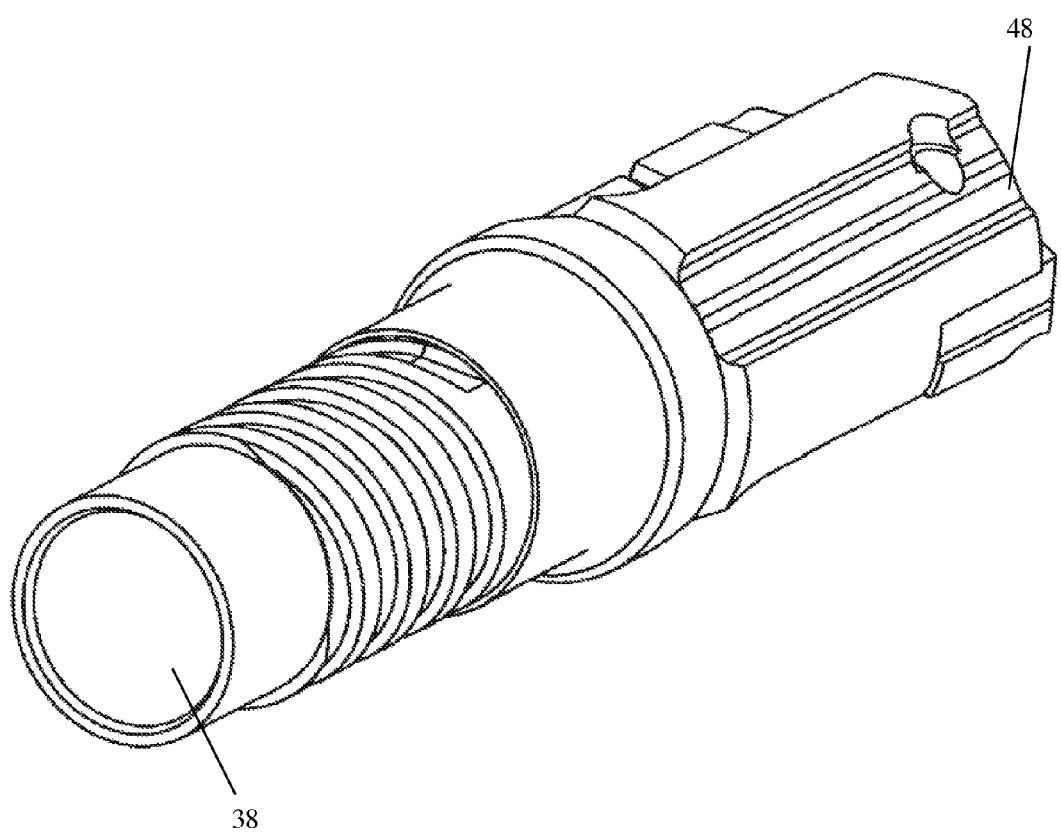
FIG. 3 is a perspective view of the drilling head of FIG. 1.

As shown in the example of FIG. 3, a channel 48 may be placed along the outer surface of the ejector holder body 12 capable of directing fluid toward the insert. The channel 48 may enable cutting fluid to flow along the perimeter of the ejector holder body 12 toward the cutting insert 14, as shown in FIG. 3. The channel 48 may be approximately parallel to an axis through the ejector holder body 12. The channel 48 may be approximately parallel to an axis of rotation of the drilling head. Alternately, the channel 48 may be directed in an angled orientation, spiral orientation, arcuate orientation, or any other orientation capable of directing the cutting fluid toward the insert. The cutting fluid passing through the drilling system may act as a coolant for cooling the material being sheared in the cutting area to promote manageable chip formation. The cutting fluid also flushes the chips from the cutting area and evacuates the chips from the drilled hole. The coolant channels placed axially along the holder body 12 allow coolant to flow forward from the coolant tube, along the perimeter of the holder body 12 and be directed at the cutting zone of the insert 14. the coolant fluid quenches the material being sheared in the cutting zone and provides coolant flow in the direction for the formed chips to travel from the cutting zone to the evacuation cross hole and channel described below, and through the coolant tube and out of the machining center.

The ejector holder body 12 further comprises one or more cross holes, or bores 50 passing from one or more gullets 52 to the evacuation channel, or duct 38. The gullets 52 provide a passage for chips and cutting fluid from the cutting insert 14 to the bores 50. Relief areas 54 may be provided adjacent the bores 50 for directing chips and cutting fluid into the bores and reducing the chips collecting in the gullets 52.

In an example, the evacuation cross hole 50 passes through both gullets 52 approximately normal to the center axis of the holder body 12. Alternately, the bores 50 may pass through ejector holder body 12 at an angle to the axis of the ejector holder body 12. The bores 50 enable the chips and cutting fluid flushed from the cutting area to enter the duct 38.

The duct 38 may extend through the ejector holder body 12 between the shank end 36 and the bores 50. The chips that are evacuated from the cutting area may be flushed along the gullets 52, through the bores 50 and into the duct 38. The chips and cutting fluid from the drilled hole are flushed through the duct 38 and into the boring shank, or tube. From there the cutting fluid and chips flow through the tube and out of the machining center.

In operation, when the cutting edges 22 have reached their expected life, the cutting inserts 14 can be removed from the ejector holder body 12 by removing screws 43 and removing the inserts. A new cutting insert 14 may be installed and the drilling process continued.

The drilling head 10 may be used with Single Tube or Double Tube Systems. The disclosed drilling head 10 has advantages over the existing drill systems. Firstly, the substrate, coating, and geometry options may allow for this tool 10 to function in applications where prior art drills fail. The substrate material of the cutting insert 14 may be changed to accommodate different types of applications. Also, different coatings may be usable in association with the insert 14. For example, a diamond film coating may be used on the cutting surfaces and clearance surfaces of insert 14 to minimize flank wear growth. Examples of these types of films include carbon vapor deposition (CVD) polycrystalline diamond film which is well known in the industry. Diamond film coatings are especially helpful when cutting non-metallic abrasive materials for example. Other coating materials, such as titanium aluminum nitride, may be used. The insert 14 may be coated by known suitable methods, with a desired coating based upon a particular application for the tool 10. The use of insert 14 also allows the cutting geometry to be formed for various applications, with various modifications in cutting geometry possible to enhance the cutting performance for different applications or materials. For example, different cutting geometries may include, but are not limited to, the cutting lip geometry having a positive rake angle, the cutting web having a positive rake angle, the insert 14 having a self-centering point, and/or providing a desired chip breaking configuration in association with the cutting edges. Positive cutting lip geometry produces a tightly curled chip that is easy to evacuate through the tool, with the compact size of the chip resulting from the predetermined lip position, size and configuration. Many modifications can be made to the lip configuration to enhance the development of chip formation for example. The use of a positive cutting web geometry allows the material at the point of insert 14 to shear and form a more manageable chip, which can minimize the action of extruding material at the center of the drilled hole due to the low velocity differential at the center of the drill point. The web geometry can thus be configured to allow for much more mechanical chip formation at this location of the drill point, and result in less extrusion due to the shearing ability of the web cutting edge, and a freer cutting drill center. This also can provide the benefit of drilling a hole that starts on center and retains an improved overall straightness. A self-centering point geometry may be provided by a combination of clearance features on the point of the insert 14 that improve the centering capability. Improving the centering capability can improve the drilling stability and overall hole straightness. The addition of chip breakers can control the developing chip width, thereby assisting in creating a formable chip that can be evacuated through the center of the holder body as will be described.

A second advantage with the disclosed drilling head 10 is a reduction in cost per hole. This may be realized in several different ways. The brazed drill heads in the prior art are a one piece design. When the tool is worn out or damaged the entire drill head must be replaced. This can be costly, especially as the hole diameter increases. With the presently disclosed drilling head 10, an operator may replace the worn or damaged cutting insert 14. The drilling head 10 thus provides the ability to quickly and efficiently change the cutting edges when they become worn. The cost of the ejector holder body 12 may be amortized over multiple cutting insert 14 changes reducing the total tool cost.

The cost per hole can also be calculated based on an increased penetration rate. The presently disclosed drilling head 10 may include two effective cutting edges. This design can offer a significant performance advantage over the prior art having a single cutting edge. With two effective cutting edges presently disclosed drilling head 10 could double the feed rate of a comparable single cutting edge design. This increased penetration rate reduces the time in the cut freeing up machine time. The arrangement according to the examples of the present invention provides various advantages and overcomes problems associated with prior systems. For example, the arrangement does not result in work hardening or the materials adjacent the hole, as no significant forces are imposed on the sides of the formed hole. The system does not cut on itself as with prior STS systems, and the wear pad does bear against the hole with excessive force, as there are two effective cutting edges in the system. The cutting geometry provides for an included angle such that radial loads imposed by the system are minimal, and heat generation is also minimized, such that no embrittlement of the machined material occurs.

Figure 6:
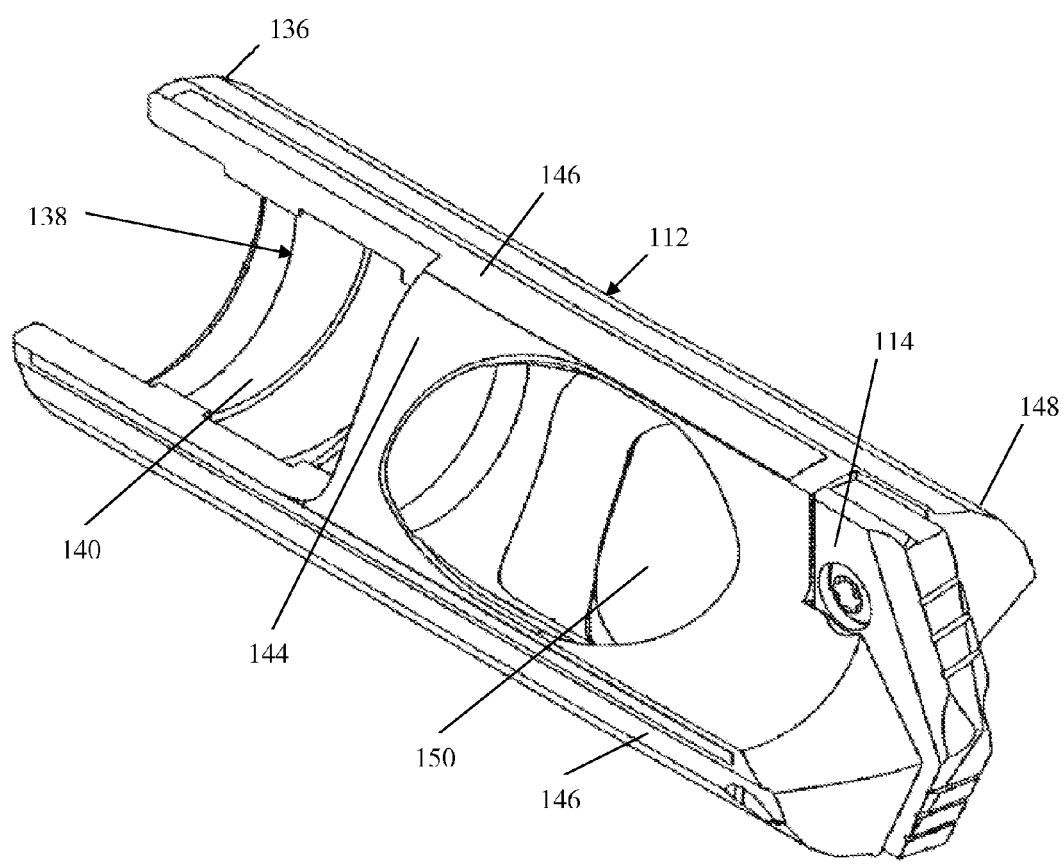
FIG. 6 is a perspective view of another embodiment of a drilling head of the present disclosure.

An alternate example of the invention is shown in FIG. 6, wherein the ejector holder body 112 may also comprise a generally tubular shape having a first end, or shank end 136, and a second end, or insert end having an insert 214 as in the prior examples. The holder body 112 may again have an evacuation channel, or duct through at least a portion of the ejector holder body 112 which may exit the shank end for passing chips and cutting fluid through the ejector holder body 112 and into the shank, or tube. The shank end 136 may be configured to attach to a boring shank, or tube, (not shown). The tube may have an inside diameter and internal threads 140 for attaching the drilling head. The ejector holder body 112 may comprise threads 140 adjacent the first end, or shank end 136, corresponding to the threads on the shank and aligning the duct 138 with the shank, or tube, inside diameter. The duct 38 does not have to be the same diameter as the inside diameter of the tube when the duct and tube are aligned. The threads 140 may be multiple lead locking threads. Alternately, the threads 140 may be a single lead thread.

Figure 7:
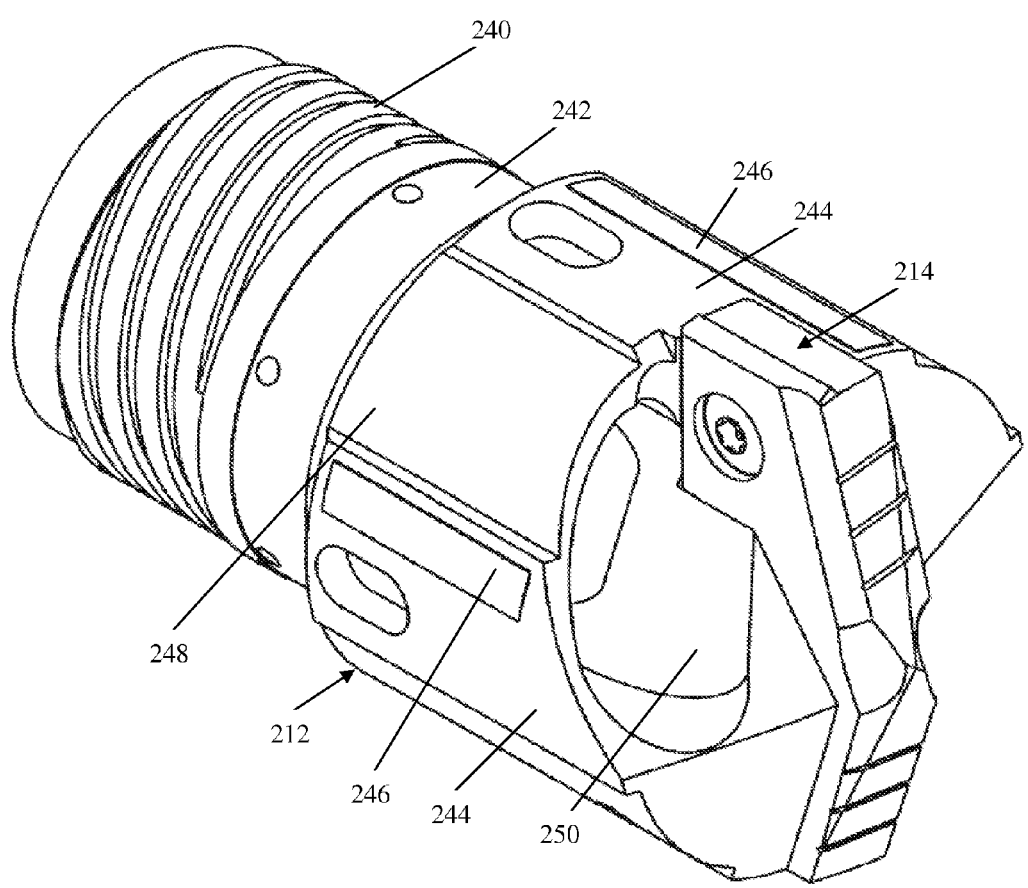
FIG. 7 is a perspective view of yet another embodiment of a drilling head of the present disclosure.

A further example is shown in FIG. 7, wherein the ejector holder body 212 may again comprise a generally tubular shape having a first end, or shank end, and a second end, or insert end. An evacuation channel, or duct is again provided through at least a portion of the ejector holder body 212 and exits the shank end for passing chips and cutting fluid through the ejector holder body 212 and into the shank, or tube. The shank end may be configured to attach to a boring shank, or coolant tube, (not shown). The tube may have an inside diameter and threads for attaching the drilling head. The ejector holder body 212 may comprise threads 240 adjacent the first end, or shank end, corresponding to the threads on the shank and aligning the duct with the shank, or tube, inside diameter, as in prior examples. The threads 240 may be multiple lead locking threads, or alternately, may be a single lead thread. A tube bearing surface 242 may be provided on the ejector holder body 212 adjacent the intersection of the tube or shank and the ejector holder body 212. The tube bearing surface 242 may fit within an inside diameter of the tube and fit adjacent an inside surface of the tube. The tube bearing surface 242 may be used to align the ejector holder body 212 with the coolant tube. The tube bearing surface may be precision ground to mate closely with the inside surface of the tube. A close tolerance fit may reduce total indicator run-out associated with the ejector drilling system and improve hole straightness. The boring shank, or tube, may be provided with threads on the inside surface corresponding to the threads 240 of the ejector holder body 212. The inside tube threads may be multiple lead locking threads that draw the threads 240 tighter into the tube as the drilling system is rotated in operation, and installs the holder body 12 to the coolant tube securely.

The ejector holder body 212 may comprise a bearing area 244. The bearing area 244 may include one or more outer surfaces of the ejector holder body 212. The bearing area 244 may have a layer of chrome or other wear material to protect the bearing area 244 in operation. The chrome or other wear material serves to help protect the holder outside diameter as it guides the drill 10. The outer diameter of the bearing area 244 may be slightly smaller than drill diameter. The chrome layer may protect the bearing area 244 at lower rotational speeds and temperatures. For higher speed operation, a carbide clad material may be used in association with the bearing surface 244. Additionally, carbide wear strips 246 may be used to protect the ejector holder body 212. The carbide wear strips 246 may be provided in association with the bearing area 244. The wear strips 246 are provided on at least a portion of the outer surface of the body, and may comprise a thin strip of a carbide material on the surface positioned at an outside diameter of the body. The outer diameter of the strips 246 may be slightly smaller than drill diameter. The wear strips 246 may protect the bearing area 244 at higher rotational speeds and temperatures. The wear strips 246 may be brazed into position or otherwise suitably secured to the holder body 212. Alternatively, the wear strips 246 may be bolted in or otherwise suitably connected to the holder body 212. The wear strips 246 may be produced using carbide beading, but other suitable approaches are contemplated. The thickness of the wear strips 246 may be increased/decreased as suitable for the application. The wear strips 246 may be formed of a carbide material, such as titanium carbide, a tungsten carbide, aluminum bronze, high speed steel, hard chroming or other suitable wear material. A channel 248 may be placed along the outer surface of the ejector holder body 212 capable of directing fluid toward the insert 214. The channel 248 may enable cutting fluid to flow along the perimeter of the ejector holder body 212 toward the cutting insert 214.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A drilling tool comprising:
a cutting head having a body comprising an outer surface with bearing surfaces positioned on opposing sides of the body, and a duct formed from an opening in the outer surface and exiting through a rear of the body; and a replaceable insert affixed to the body by a temporary fastening system, the replaceable insert comprising two cutting edges, each cutting edge extending from a rotational axis to the outside diameter of the insert in opposing manners for double effective cutting, wherein the bearing surfaces are in spaced relationship to the replaceable insert and the bearing areas and replaceable insert guide the drilling head, wherein at least one channel is formed along opposing sides of the outer surface of the body configured to direct high pressure fluid toward each of the two cutting edges of the insert, and the fluid and chips formed by the replaceable insert exiting through the duct with the opening having portions adjacent each cutting edge positioned to receive drilling fluid from each of the two cutting edges, and wherein the cutting head is coupled to a single or double tube shank configured to accept the high pressure fluid and chips formed by the replaceable insert exiting through the duct.

2. The drilling head according to claim 1, the insert further comprising at least one cutting lip adjacent each of the two cutting edges which forms a predetermined chip of material.

3. The drilling head according to claim 2, where during the manufacture of the drilling head, the position, size and/or configuration of the at least one cutting lip is altered to control the size and shape of the chip produced by the cutting lip.

4. The drilling head according to claim 2, wherein the cutting lip has a cutting geometry having a positive rake angle.

5. The drilling head according to claim 1, the insert further comprising at least one cutting web positioned adjacent a self-centering point, with the at least one cutting web comprising one or more web cutting edges.

6. The drilling head of claim 5, where the at least one cutting web has a positive rake angle.

7. The drilling head according to claim 1, wherein the bearing surfaces have a layer of material thereon to protect the bearing area in operation.

8. The drilling head according to claim 1, wherein the channels along the outer surface of the body are oriented in a manner selected from the group consisting of approximately parallel to an axis of rotation of the drilling head, an angled orientation, a spiral orientation, an arcuate orientation or combinations thereof.

9. The drilling head according to claim 1, wherein the bearing surfaces have cladding or wear pads positioned thereon.

10. The drilling head according to claim 1, the opening in the outer surface is a cross bore extending through the body to form openings on opposing sides of the body.

11. The drilling head according to claim 1, wherein the cutting edges provide an included angle between the cutting edges such that radial loads are minimized.

* * * * *